United States Patent
Li et al.

(10) Patent No.: US 12,381,476 B2
(45) Date of Patent: Aug. 5, 2025

(54) VOLTAGE CONVERTER WITH OVER-CURRENT PROTECTION AND OVER-CURRENT PROTECTION METHOD THEREOF

(71) Applicant: Chengdu Monolithic Power Systems Co., Ltd., Chengdu (CN)

(72) Inventors: Guangzhuo Li, Hangzhou (CN); Pengfei Liu, Hangzhou (CN); Siran Wang, Hangzhou (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 277 days.

(21) Appl. No.: 18/155,438

(22) Filed: Jan. 17, 2023

(65) Prior Publication Data

US 2023/0275505 A1    Aug. 31, 2023

(30) Foreign Application Priority Data

Feb. 28, 2022    (CN) .......................... 202210186814.3

(51) Int. Cl.
  *H02M 1/32* (2007.01)
  *H02M 1/00* (2006.01)
  *H02M 1/42* (2007.01)

(52) U.S. Cl.
  CPC ........... *H02M 1/32* (2013.01); *H02M 1/0009* (2021.05); *H02M 1/4208* (2013.01)

(58) Field of Classification Search
  CPC ..... H02M 1/32; H02M 1/0009; H02M 1/4208
  See application file for complete search history.

(56) References Cited

U.S. PATENT DOCUMENTS

| | | | |
|---|---|---|---|
| 9,263,876 B2 | 2/2016 | Jiang et al. | |
| 9,322,850 B2* | 4/2016 | Wood | G01R 15/04 |
| 9,660,516 B2 | 5/2017 | Fogg | |
| 10,468,973 B2 | 11/2019 | Wu et al. | |
| 2014/0160601 A1* | 6/2014 | Ouyang | H02M 3/1588 |
| | | | 361/18 |
| 2016/0261198 A1* | 9/2016 | Li | H02M 3/33507 |
| 2020/0185923 A1* | 6/2020 | Yang | H02J 3/381 |
| 2023/0147880 A1* | 5/2023 | Hosotani | H02J 50/12 |
| | | | 307/104 |

* cited by examiner

*Primary Examiner* — Rafael O De Leon Domenech
(74) *Attorney, Agent, or Firm* — Perkins Coie LLP (57) ABSTRACT

An over-current protection circuit has a current sensing circuit, an over-current comparing circuit, an isolation circuit and a control circuit. The current sensing circuit generates a current sensing signal based on a current flowing through an inductor of a voltage converter. The over-current comparing circuit receives the current sensing signal and generates a first over-current indication signal based on the current sensing signal. The isolation circuit receives the first over-current indication signal and generates a second over-current indication signal based on the first over-current indication signal. The control circuit receives the second over-current indication signal, and generates a control signal to control a switch of the voltage converter. The control circuit turns off the switch when the second over-current indication signal indicates that an over-current condition occurs.

17 Claims, 6 Drawing Sheets

VOLTAGE CONVERTER WITH OVER-CURRENT PROTECTION AND OVER-CURRENT PROTECTION METHOD THEREOF

CROSS-REFERENCE TO RELATED APPLICATIONS

This application claims the benefit of CN application 202210186814.3, filed on Feb. 28, 2022, and incorporated herein by reference.

TECHNICAL FIELD OF THE INVENTION

The present invention generally relates to electronic circuits, and more particularly but not exclusively, to voltage converters and associated over-current protection methods.

BACKGROUND OF THE INVENTION

There are different requirements of supply voltage for different loads, thus a voltage converter is needed for converting an input voltage into an output voltage satisfying certain requirements to supply power to a load. Voltage converters can be categorized into AC/DC voltage converters and DC/DC voltage converters based on the different input voltages. The design of power factor correction (PFC) topology is very important in AC/DC voltage converters to improve power conversion efficiency. Totem pole PFC circuit has been widely used in recent years because of its low conduction loss and high efficiency.

Figure 1:
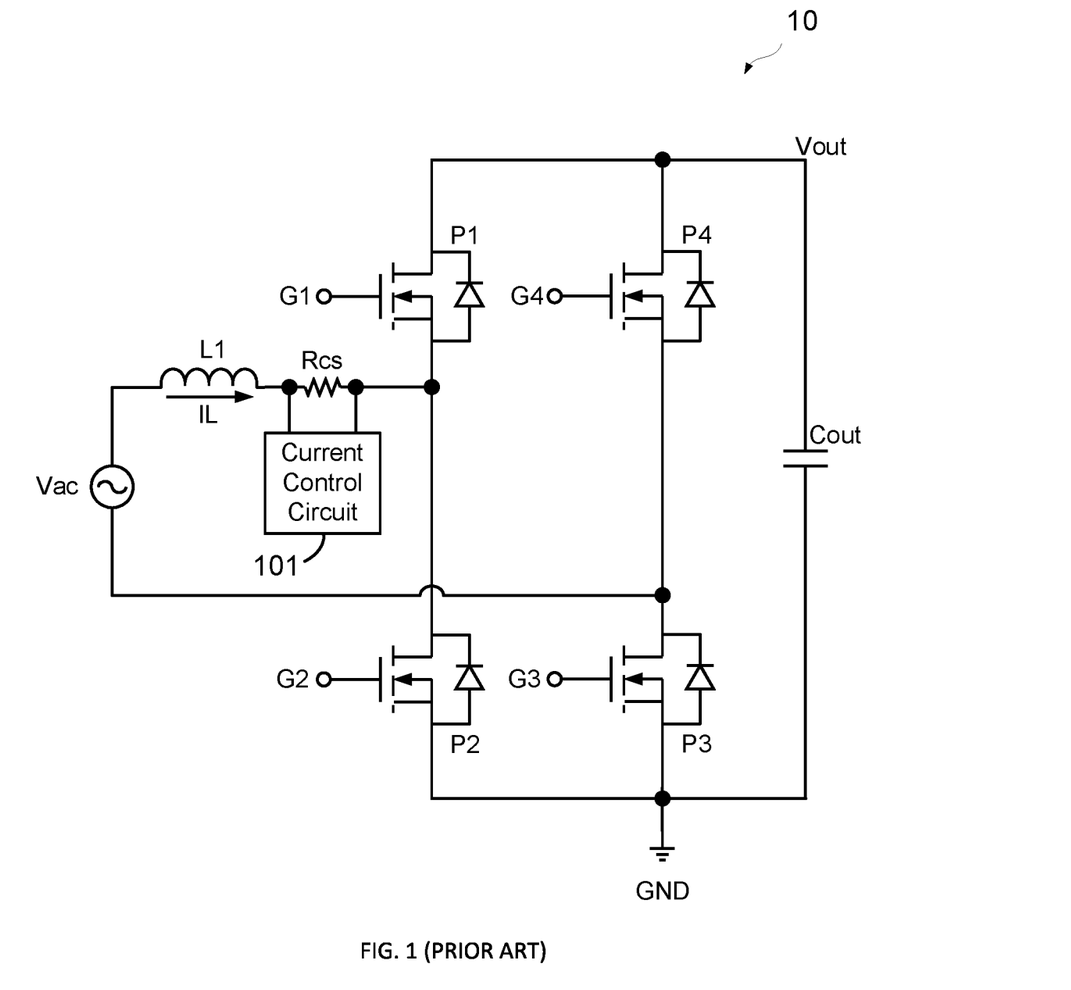
FIG. 1 illustrates a block diagram of a prior totem pole PFC circuit 10.

FIG. 1 illustrates a block diagram of a prior totem pole PFC circuit 10. The totem pole PFC circuit 10 comprises an inductor L1 coupled to an input power source Vac, a first bridge arm including switches P1 and P2, a second bridge arm including switches P3 and P4, and an output capacitor Cout. To avoid an over-current condition, a sensing resistor Rcs is coupled in series with the inductor L1 to detect a current IL flowing through the inductor L1. A current control circuit 101 senses a voltage across the sensing resistor Rcs, and generates a current sensing signal indicative of the current IL. The current sensing signal is compared with a threshold voltage to determine whether the over-current condition occurs. Switches P1 and P2 are controlled based on the comparison between the current sensing signal and the threshold voltage, to prevent damage to the totem pole PFC circuit 10 due to the over-current condition. As shown in FIG. 1, a first terminal of the sensing resistor Rcs is coupled to the input power source Vac through the inductor L1, and a second terminal of the sensing resistor Rcs is coupled to an output voltage Vout. However, both the input power source Vac and the output voltage Vout are in high voltage, the current control circuit 101 requires a high voltage isolation device or a hall device, thus causing high cost of the system circuit.

SUMMARY OF THE INVENTION

An embodiment of the present invention discloses an over-current protection circuit used in a voltage converter. The over-current protection circuit comprises a current sensing circuit, an over-current comparing circuit, an isolation circuit and a control circuit. The current sensing circuit is configured to generate a current sensing signal based on a current flowing through an inductor of the voltage converter. The over-current comparing circuit is configured to receive the current sensing signal and to generate a first over-current indication signal based on the current sensing signal. The isolation circuit is configured to receive the first over-current indication signal and to generate a second over-current indication signal based on the first over-current indication signal. The control circuit is configured to receive the second over-current indication signal, and to generate a control signal to control a switch of the voltage converter, wherein the control circuit is configured to turn off the switch when the second over-current indication signal indicates that an over-current condition occurs.

An embodiment of the present invention discloses a voltage converter comprising an inductor, a first switch, a second switch and an over-current protection circuit. The inductor has a first terminal and a second terminal, wherein the first terminal is coupled to a first input terminal of the voltage converter, and the second terminal is coupled to a switch node. The first switch is coupled between the switch node and an output terminal of the voltage converter. The second switch is coupled between the switch node and a reference ground. The over-current protection circuit is configured to generate a first over-current indication signal which indicates whether an over-current condition occurs based on a current flowing through the inductor, and to convert the first over-current indication signal into a second over-current indication signal, wherein the second over-current indication signal is configured to turn off the first switch and the second switch when the over-current condition occurs, and wherein a voltage level of the second over-current indication signal is lower than that of the first over-current indication signal.

An embodiment of the present invention discloses an over-current protection method used in a voltage converter. The over-current protection method comprises the following steps: 1) generating a current sensing signal based on a current flowing through an inductor of the voltage converter; 2) generating a first over-current indication signal based on a comparison between the current sensing signal and an over-current threshold signal; 3) generating a second over-current indication signal electrically isolated from the first over-current indication signal, wherein a voltage level of the second over-current indication signal is lower than that of the first over-current indication signal; and 4) turning off a switch of the voltage converter to reduce the current flowing through the inductor when the second over-current indication signal indicates that an over-current condition occurs.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 2:
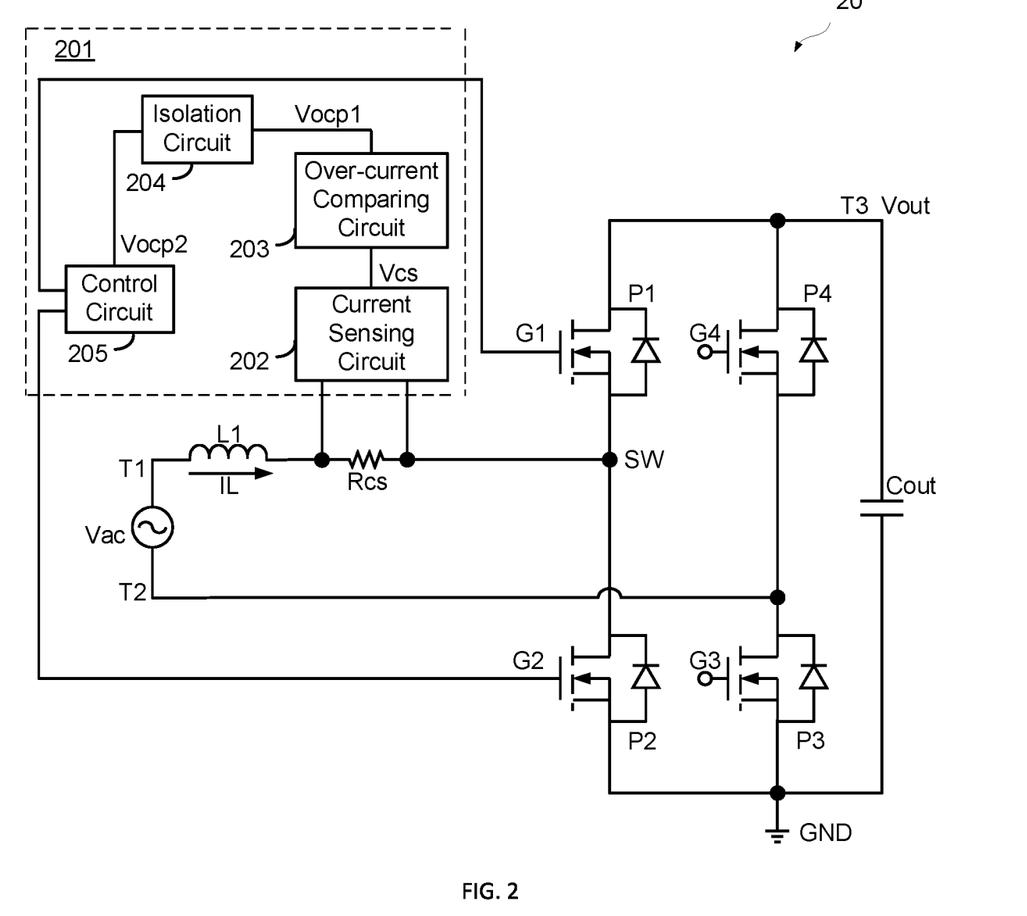
FIG. 2 illustrates a block diagram of a totem pole PFC circuit 20 in accordance with an embodiment of the present invention.

FIG. 2 illustrates a block diagram of a totem pole PFC circuit 20 in accordance with an embodiment of the present invention. The totem pole PFC circuit 20 has a first input terminal T1, a second input terminal T2 and an output terminal T3, wherein the first input terminal T1 and the second input terminal T2 are coupled across an input power source Vac, and the totem pole PFC circuit 20 provides an output voltage Vout at the output terminal T3. The totem pole PFC circuit 20 comprises an inductor L1, a first switch P1, a second switch P2, a third switch P3 and a fourth switch P4. The inductor L1 has a first terminal and a second terminal, wherein the first terminal is coupled to the first input terminal T1, and the second terminal is coupled to a switch node SW. The first switch P1 is coupled between the output terminal T3 and the switch node SW. The second switch P2 is coupled between the switch node SW and a reference ground GND. The third switch P3 is coupled between the second input terminal T2 and the reference ground GND. The fourth switch P4 is coupled between the second input terminal T2 and the output terminal T3. The totem pole PFC circuit 20 further comprises an output capacitor Cout coupled between the output terminal T3 and the reference ground GND for filtering the output voltage Vout.

As shown in FIG. 2, the totem pole PFC circuit 20 further comprises a sensing resistor Rcs and an over-current protection circuit 201. The sensing resistor Rcs is coupled in series with the inductor L1, thus a current flowing through the sensing resistor Rcs is equal to a current IL flowing through the inductor L1. The over-current protection circuit 201 comprises a current sensing circuit 202, an over-current comparing circuit 203, an isolation circuit 204 and a control circuit 205. The current sensing circuit 202 is coupled across the sensing resistor Rcs, and generates a current sensing signal Vcs based on the current flowing through the sensing resistor Rcs, i.e., the current IL of the totem pole PFC circuit 20. The over-current comparing circuit 203 is coupled to the current sensing circuit 202 to receive the current sensing signal Vcs, and generates a first over-current indication signal Vocp1 based on the current sensing signal Vcs. The isolation circuit 204 is coupled to the over-current comparing circuit 203 to receive the first over-current indication signal Vocp1, and generates a second over-current indication signal Vocp2 based on the first over-current indication signal Vocp1. The control circuit 205 is coupled to the isolation circuit 204 to receive the second over-current indication signal Vocp2. When the second over-current indication signal Vocp2 indicates that an over-current condition of the current IL occurs, the control circuit 205 provides a first control signal G1 and a second control signal G2 to turn off the first switch P1 and the second switch P2 respectively.

In the example of FIG. 2, the input power source Vac provides an alternating current voltage. When the input power source Vac provides a positive input voltage, the third switch P3 keeps on, the fourth switch P4 keeps off, and the first switch P1 and the second switch P2 are switched on and off alternately. Similarly, when the input power source Vac provides a negative input voltage, the third switch P3 keeps off, the fourth switch P4 keeps on, and the first switch P1 and the second switch P2 are switched on and off alternately. If the over-current condition occurs, the first switch P1 and the second switch P2 should be turned off in time, to prevent undesired damage to the circuit.

In the example of FIG. 2, when the input power source Vac provides the positive input voltage, the second switch P2 is a main switch, and the first switch P1 is a sync switch. When the second switch P2 is on and the first switch P1 is off, the current IL increases. The current IL flows through the sensing resistor Rcs and the second switch P2 at the same time, thus a voltage across the sensing resistor Rcs represents the current IL. The current IL can also be sensed by sensing a current flowing through the second switch P2. When the second switch P2 is off and the first switch P1 is on, the current IL decreases. When the second over-current indication signal Vocp2 indicates that the over-current condition occurs, the second control signal G2 will turn off the second switch P2. The first switch P1 is off at the time and will keep off. Similarly, when the input power source Vac provides the negative input voltage, the first switch P1 is the main switch, and the second switch P2 is the sync switch. When the first switch P1 is on and the second switch P2 is off, the current IL increases. The current IL flows through the sensing resistor Rcs and the first switch P1 at the same time, thus the voltage across the sensing resistor Rcs represents the current IL. The current IL can also be sensed by sensing a current flowing through the first switch P1. When the first switch P1 is off and the second switch P2 is on, the inductor IL decreases. When the second over-current indication signal Vocp2 indicates that the over-current condition occurs, the first control signal G1 will turn off the first switch P1. The second switch P2 is off at the time and will keep off.

Those skilled in the art can understand that, the over-current protection circuit 201 can be used in other voltage converters, such as Buck, Boost and so on. In Buck and Boost, the main switch is fixed and unique. For example, a high side switch in Buck is the main switch, while a low side switch in Boost is the main switch. In these cases, when the over-current condition occurs, the second over-current indication signal Vocp2 may be used to turn off the main switch only.

In some embodiments, the voltage across the sensing resistor Rcs can be up to several hundred volts, such as 600V. In this case, if a control circuit of the totem pole PFC circuit 20 senses the voltage across the sensing resistor Rcs directly to obtain the current IL, the control circuit needs to withstand several hundred volts, such high voltage devices will increase circuit cost greatly.

In the examples of the present invention, the current sensing circuit 202 and the over-current comparing circuit 203 can be integrated in a first integrated circuit (IC), while the control circuit 205 and other control circuits of the totem pole PFC circuit 20 can be integrated in a second IC. In this case, the control circuit 205 and other control circuits of the totem pole PFC circuit 20 do not need high voltage devices, thus the circuit cost is greatly reduced.

In some embodiments, the isolation circuit 204 can be also integrated in the first IC together with the current sensing circuit 202 and the over-current comparing circuit 203.

In some embodiments, the first IC and the second IC are packaged in a signal module.

Figure 3:
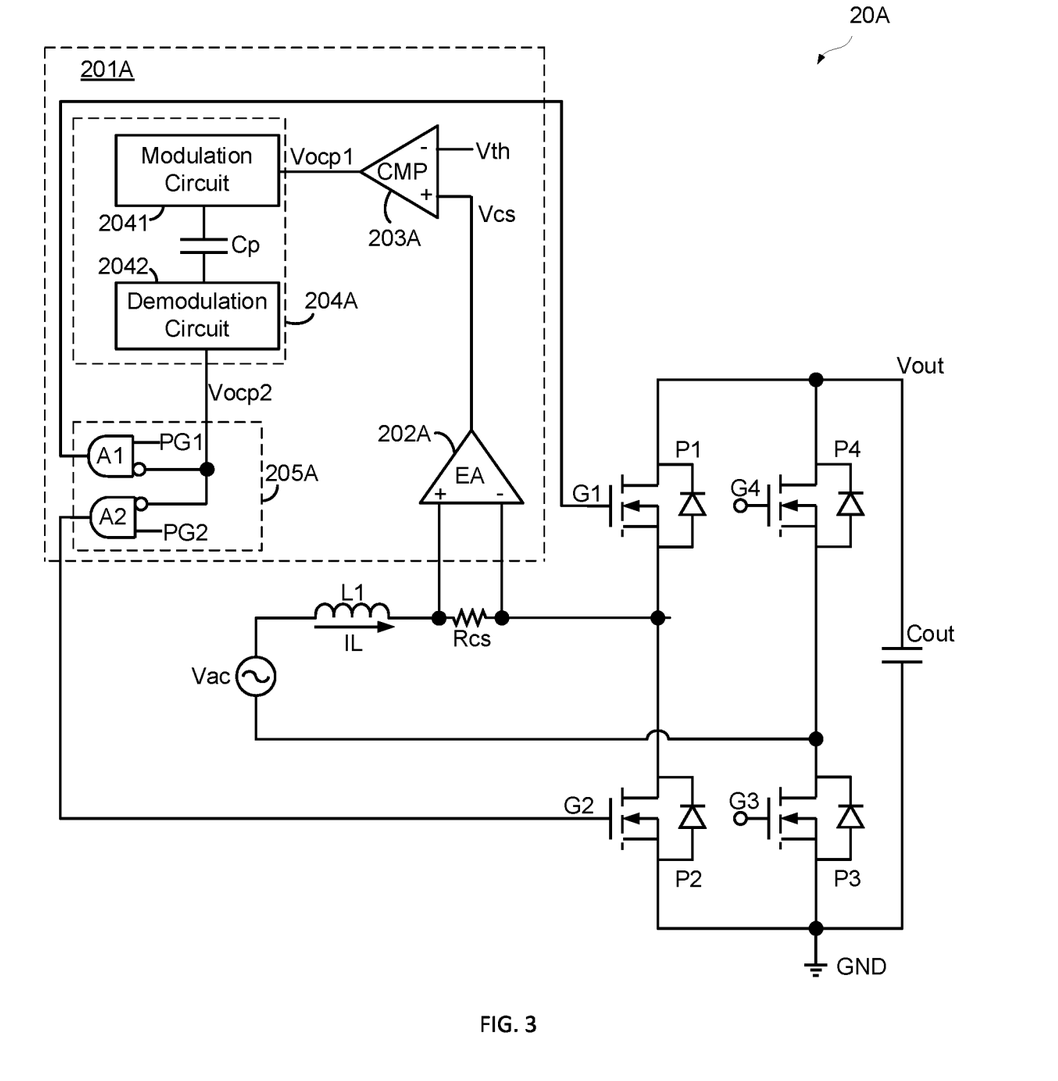
FIG. 3 illustrates a totem pole PFC circuit 20A in accordance with an embodiment of the present invention.

FIG. 3 illustrates a totem pole PFC circuit 20A in accordance with an embodiment of the present invention. The totem pole PFC circuit 20A comprises an over-current protection circuit 201A. The over-current protection circuit 201A comprises an error amplifier 202A, a comparator 203A, an isolation circuit 204A and a control circuit 205A. The error amplifier 202A has a first input terminal and a second input terminal coupled across a sensing resistor Rcs. Based on a voltage across the sensing resistor Rcs, the error amplifier 202A generates a current sensing signal Vcs. The comparator 203A receives the current sensing signal Vcs and generates a first over-current indication signal Vocp1 based on a comparison between the current sensing signal Vcs and an over-current threshold signal Vth. The isolation circuit 204A comprising a capacitor Cp is coupled to the comparator 203A to receive the first over-current indication signal Vocp1, and generates a second over-current indication signal Vocp2 based on the first over-current indication signal Vocp1. The control circuit 205A receives a first pre-control signal PG1, a second pre-control signal PG2 and the second over-current indication signal Vocp2. The control circuit 205A generates a first control signal G1 to control a first switch P1 based on the first pre-control signal PG1 and the second over-current indication signal Vocp2, and generates a second control signal G2 to control a second switch P2 based on the second pre-control signal PG2 and the second over-current indication signal Vocp2. When the second over-current indication signal Vocp2 indicates that the over-current condition occurs, the first control signal G1 and the second control signal G2 turn off the first switch P1 and the second switch P2 respectively.

In the example of the present invention, the first pre-control signal PG1 and the second pre-control signal PG2 can be generated by other control circuits of the totem pole PFC circuit 20A. In the example of FIG. 3, to realize over-current protection, the first pre-control signal PG1 and the second over-current indication signal Vocp2 are combined to control the first switch P1, and the second pre-control signal PG2 and the second over-current indication signal Vocp2 are combined to control the second switch P2. In other embodiments, the second over-current indication signal Vocp2 can control the first switch P1 and the second switch P2 directly. For example, in case of the over-current condition, the second over-current indication signal Vocp2 turns off the first switch P1 and the second switch P2 directly. In other cases, the second over-current indication signal Vocp2 does not affect the turning-on or turning-off of the first switch P1 and the second switch P2.

In the example of FIG. 3, the isolation circuit 204A further comprises a modulation circuit 2041 and a demodulation circuit 2042. The modulation circuit 2041 is coupled between the capacitor Cp and the comparator 203A, and modulates the first over-current indication signal Vocp1 into a carrier signal. The capacitor Cp transmits the carrier signal from the modulation circuit 2041 to the demodulation circuit 2042. The demodulation circuit 2042 receives the carrier signal and demodulates the carrier signal to generate the second over-current indication signal Vocp2. In detail, the modulation circuit 2041 adds pulses with a certain frequency into the logic high period of the first over-current indication signal Vocp1 to obtain the carrier signal. The demodulation circuit 2042 filters the carrier signal, and restores it to a logic high signal. Thus, the second over-current indication signal Vocp2 can restore exactly the first over-current indication signal Vocp1. In one embodiment, the modulation circuit 2041 comprises an oscillator, and the demodulation circuit 2042 comprises a filtering circuit.

In one embodiment, the modulation circuit 2041, the comparator 203A and the error amplifier 202A are integrated in a first IC, the demodulation circuit 2042 and the control circuit 205A are integrated in a second IC.

Those skilled in the art can understand that, the modulation circuit 2042 and the demodulation circuit 2042 are not necessary. In other embodiments, the reliable signal transmission between the two ends of an isolation device can be realized by other methods. For example, a logic circuit, such as a RS flip flop, can also detect the logic high period of the first over-current indication signal Vcop1, i.e., the time period when the over-current condition occurs.

In the example of FIG. 3, the control circuit 205A comprises two AND gate circuits A1 and A2. The logic high of the second over-current indication signal Vocp2 indicates that the over-current condition occurs. The second over-current indication signal Vocp2 is inverted, and then the inverted signal conducts AND logic operation with the first pre-control signal PG1 to obtain the first control signal G1, and conducts AND logic operation with the second pre-control signal PG2 to obtain the second control signal G2. When the second over-current indication signal Vcop2 is in logic high, i.e., the over-current condition occurs, both the first control signal G1 and the second control signal G2 are logic low. In the example of FIG. 3, the first switch P1 and the second switch P2 both comprise N-type Metal-Oxide-Semiconductor Field Effect Transistor (MOSFET), thus the first switch P1 and the second switch P2 are turned off by the first control signal G1 and the second control signal G2 in logic low respectively.

Those skilled in the art can understand that, the first switch P1 and the second switch P2 can be other controllable switches, such as P-type MOSFET, JFET and so on. Different switches can be turned off by different conditions, thus the control circuit 205A should be adjusted accordingly when the first switch P1 and the second switch P2 are replaced by other controllable switches. Besides, when the second over-current indication signal Vcop2 changes, the control circuit 205 should be adjusted accordingly, too. For example, when the logic low of the second over-current indication signal Vcop2 indicates that the over-current condition occurs, the second over-current indication signal Vcop2 can conduct AND logic operation directly with the first pre-control signal PG1 and the second pre-control signal PG2 to obtain the first control signal G1 and the second control signal PG2 respectively. When a rising edge or a falling edge of the second over-current signal Vcop2 indicates that the over-current occurs, the control signal 205A can comprise a RS flip flop.

In the example of FIG. 3, the isolation circuit 204A converts the first over-current indication signal Vcop1 in high voltage level into the second over-current indication signal Vcop2 in low voltage level. In some embodiments, the voltage of the first over-current indication signal Vcop1 can be up to several hundred Volts, while the voltage of the second over-current indication signal Vcop2 may be ten Volts. Because the second over-current indication signal Vcop2 is in low voltage level, the control circuit 205A can adopt low voltage devices. Besides, other control circuits for generating the pre-control signals PG1, PG2 and the control signals PG3, PG4 can also adopt low voltage devices. As a result, the circuit cost is reduced.

Figure 4:
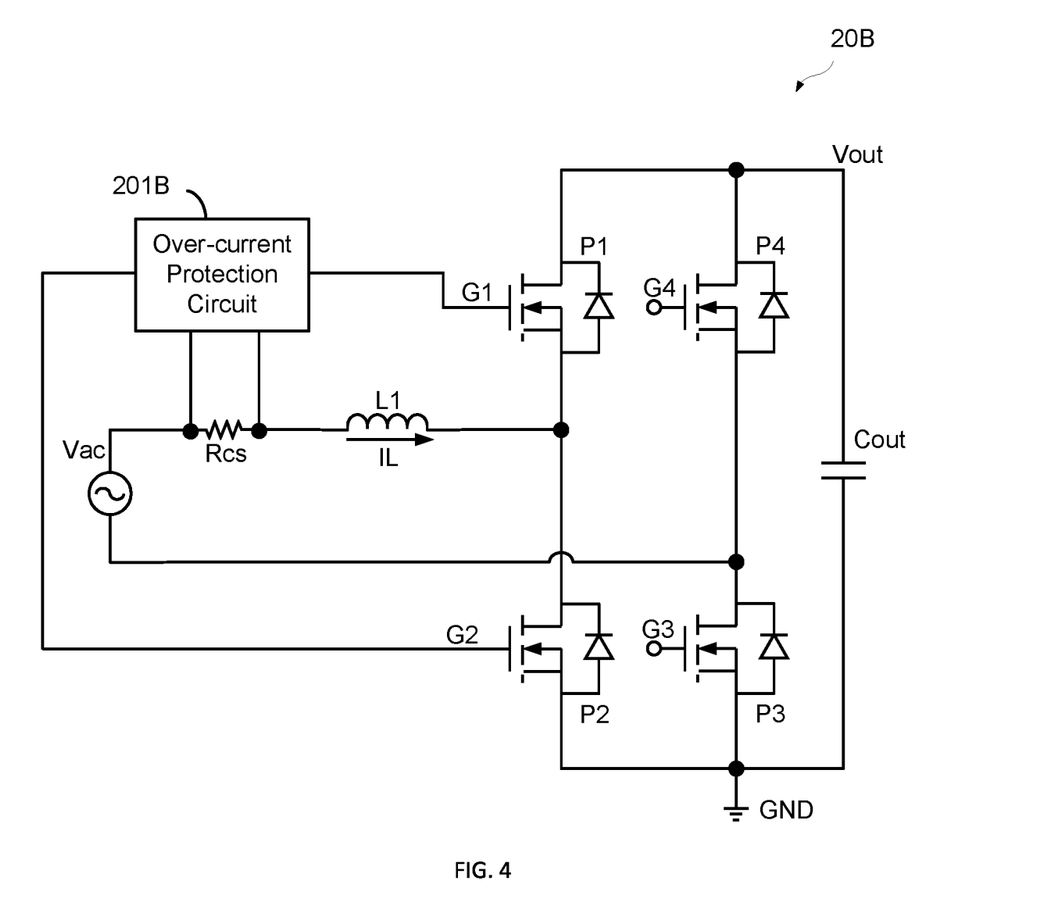
FIG. 4 illustrates a schematic diagram of a totem pole PFC circuit 20B in accordance with an embodiment of the present invention.
Figure 5:
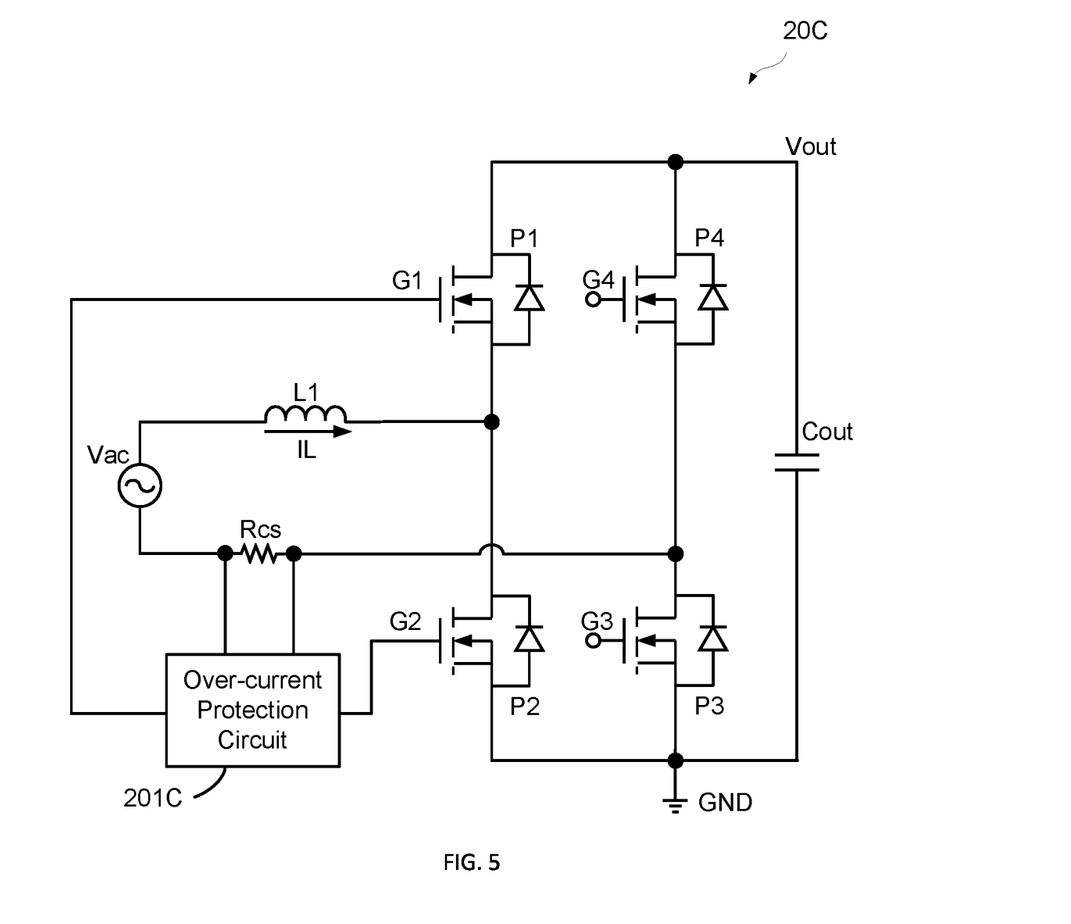
FIG. 5 illustrates a schematic diagram of a totem pole PFC circuit 20C in accordance with another embodiment of the present invention.

In other embodiments, the isolation circuit 204A in FIG. 3 can be replaced by other isolation devices, such as a transformer, to convert the first over-current indication signal Vcop1 in high voltage level into the second over-current indication signal Vcop2 in low voltage level. The sensing resistor Rcs is coupled between the inductor L1 and the switch node SW both in FIG. 2 and FIG. 3. However, those skilled in the art can understand that, the sensing resistor Rcs can be placed in other positions. In the example of FIG. 4, the sensing resistor Rcs is coupled between the input power source Vac and the inductor L1. In the example of FIG. 5, the sensing resistor Rcs is coupled between the input power source Vac and a common connection node of the third switch P3 and the fourth switch P4.

Figure 6:
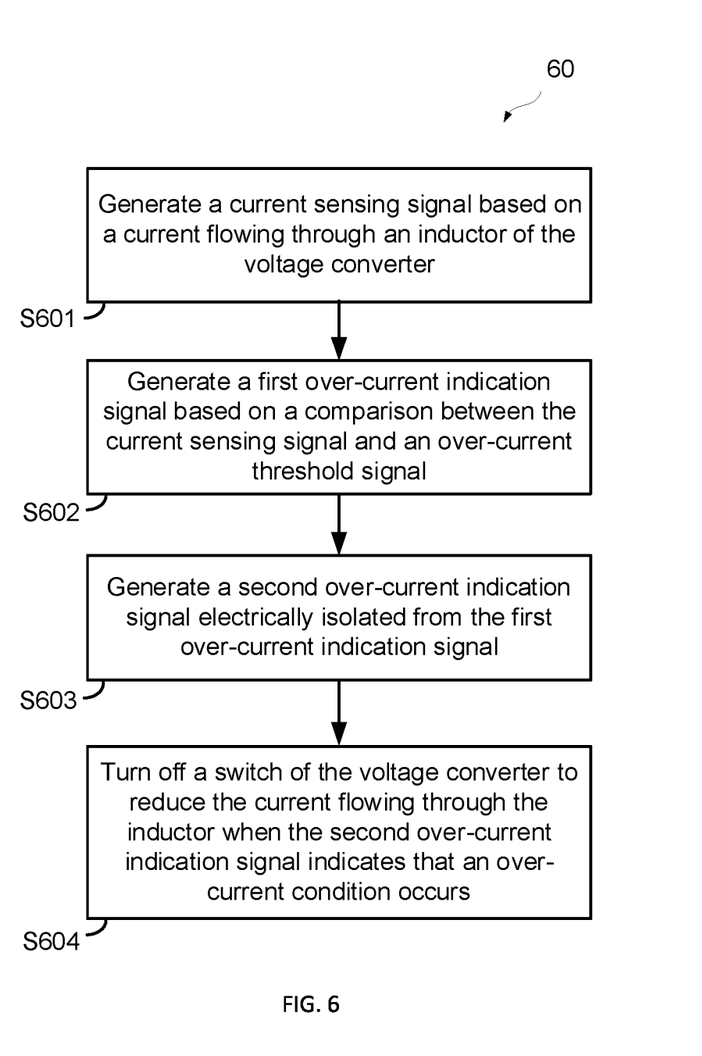
FIG. 6 illustrates a flowchart of an over-current protection method 60 in accordance with an embodiment of the present invention.

FIG. 6 illustrates a flowchart of an over-current protection method 60 in accordance with an embodiment of the present invention. The over-current protection method 60 can be used in a voltage converter, and provide an over-current indication signal in low voltage level to a control circuit of the voltage converter for over-current protection. The voltage converter may be PFC circuit, Buck, Boost and so on. The over-current protection method 60 includes steps S601-S604.

At step S601, a current sensing signal is generated based on a current flowing through an inductor of the voltage converter.

At step S602, a first over-current indication signal is generated based on a comparison between the current sensing signal and an over-current threshold signal.

At step S603, a second over-current indication signal electrically isolated from the first over-current indication signal is generated, wherein a voltage level of the second over-current indication signal is lower than that of the first over-current indication signal.

At step S604, a switch of the voltage converter is turned off to reduce the current flowing through the inductor when the second over-current indication signal indicates that an over-current condition occurs.

In one embodiment, the current flowing through the inductor can be sensed by sensing a current flowing through the switch.

In one embodiment, a sensing resistor is coupled in series with the inductor. The current flowing through the inductor can be sensed by sensing a voltage across the sensing resistor.

In one embodiment, the second over-current indication signal is electrically isolated from the first over-current indication signal through a capacitor.

In another embodiment, the second over-current indication signal is electrically isolated from the first over-current indication signal through a transformer.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. An over-current protection circuit used in a voltage converter, the over-current protection circuit comprising:
   a current sensing circuit configured to generate a current sensing signal based on a current flowing through an inductor of the voltage converter;
   an over-current comparing circuit configured to receive the current sensing signal and to generate a first over-current indication signal based on the current sensing signal;
   an isolation circuit configured to receive the first over-current indication signal and to generate a second over-current indication signal based on the first over-current indication signal, wherein the isolation circuit comprises a capacitor; and
   a control circuit configured to receive the second over-current indication signal, and to generate a control signal to control a switch of the voltage converter, wherein the control circuit is configured to turn off the switch when the second over-current indication signal indicates that an over-current condition occurs.

2. The over-current protection circuit of claim 1, wherein the current sensing circuit comprises:
   an error amplifier having a first input terminal, a second input terminal and an output terminal, wherein the first input terminal and the second terminal are coupled across a sensing resistor which is coupled in series with the inductor, and the error amplifier is configured to generate the current sensing signal at the output terminal based on a voltage across the sensing resistor.

3. The over-current protection circuit of claim 1, wherein the over-current comparing circuit comprises:
   a comparator configured to receive the current sensing signal and to generate the first over-current indication signal based on a comparison between the current sensing signal and an over-current threshold signal.

4. The over-current protection circuit of claim 1, wherein the isolation circuit further comprises:
   a modulation circuit coupled between the over-current comparing circuit and the capacitor, and configured to modulate the first over-current indication signal into a carrier signal; and a demodulation circuit coupled between the capacitor and the control circuit, and configured to generate the second over-current indication signal based on the carrier signal.

5. The over-current protection circuit of claim 1, wherein the control circuit comprises:
a logic circuit configured to receive the second over-current indication signal and a pre-control signal, and to generate the control signal to turn off the switch based on the second over-current indication signal and the pre-control signal.

6. The over-current protection circuit of claim 1, wherein the current sensing circuit and the over-current comparing circuit are integrated in a first integrated circuit (IC), and wherein the control circuit is integrated in a second IC.

7. The over-current protection circuit of claim 6, wherein the isolation circuit, the current sensing circuit and the over-current comparing circuit are integrated in the first IC.

8. A voltage converter comprising:
an inductor having a first terminal and a second terminal, wherein the first terminal is coupled to a first input terminal of the voltage converter, and the second terminal is coupled to a switch node;
a first switch coupled between the switch node and an output terminal of the voltage converter;
a second switch coupled between the switch node and a reference ground; and
an over-current protection circuit configured to generate a first over-current indication signal which indicates whether an over-current condition occurs based on a current flowing through the inductor, and to convert the first over-current indication signal into a second over-current indication signal, wherein the second over-current indication signal is configured to turn off the first switch and the second switch when the over-current condition occurs, and wherein a voltage level of the second over-current indication signal is lower than that of the first over-current indication signal, wherein the over-current protection circuit comprises an isolation circuit configured to receive the first over-current indication signal and to generate the second over-current indication signal based on the first over-current indication signal, the isolation circuit comprises a capacitor.

9. The voltage converter of claim 8, further comprising:
a third switch coupled between a second input terminal of the voltage converter and the reference ground; and
a fourth switch coupled between the second input terminal of the voltage converter and the output terminal of the voltage converter.

10. The voltage converter of claim 8, wherein the over-current protection circuit further comprises:
a current sensing circuit configured to generate a current sensing signal based on a voltage across a sensing resistor coupled in series with the inductor;
an over-current comparing circuit configured to receive the current sensing signal and to generate the first over-current indication signal based on the current sensing signal; and
a control circuit configured to receive the second over-current indication signal, and to turn off the first switch and the second switch when the second over-current indication signal indicates that the over-current condition occurs.

11. The voltage converter of claim 10, wherein the isolation circuit further comprises:
a modulation circuit coupled between the over-current comparing circuit and the capacitor, and configured to modulate the first over-current indication signal into a carrier signal; and
a demodulation circuit coupled between the capacitor and the control circuit, and configured to generate the second over-current indication signal based on the carrier signal.

12. The voltage converter of claim 10, wherein the control circuit comprises:
a logic circuit configured to receive the second over-current indication signal, a first pre-control signal and a second pre-control signal, to generate a first control signal to control the first switch based on the second over-current indication signal and the first pre-control signal, and to generate a second control signal to control the second switch based on the second over-current indication signal and the second pre-control signal.

13. The voltage converter of claim 10, wherein the current sensing circuit comprises:
an error amplifier having a first input terminal, a second input terminal and an output terminal, wherein the first input terminal and the second terminal are coupled across the sensing resistor, and the error amplifier is configured to generate the current sensing signal at the output terminal based on the voltage across the sensing resistor.

14. The voltage converter of claim 10, wherein the over-current comparing circuit comprises:
a comparator configured to receive the current sensing signal and to generate the first over-current indication signal based on a comparison between the current sensing signal and an over-current threshold signal.

15. The voltage converter of claim 8, wherein the voltage converter comprises a power factor correction circuit.

16. An over-current protection method used in a voltage converter, the over-current protection method comprising:
generating a current sensing signal based on a current flowing through an inductor of the voltage converter;
generating a first over-current indication signal based on a comparison between the current sensing signal and an over-current threshold signal;
generating a second over-current indication signal electrically isolated from the first over-current indication signal through a capacitor, wherein a voltage level of the second over-current indication signal is lower than that of the first over-current indication signal; and
turning off a switch of the voltage converter to reduce the current flowing through the inductor when the second over-current indication signal indicates that an over-current condition occurs.

17. The over-current protection method of claim 16, wherein the current flowing through the inductor is sensed by sensing a current flowing through the switch.

* * * * *